US009426469B2

(12) United States Patent
Hellman

(10) Patent No.: US 9,426,469 B2
(45) Date of Patent: Aug. 23, 2016

(54) COMBINATION HEVC DEBLOCKER/SAO FILTER

(71) Applicant: Broadcom Corporation, Irvine, CA (US)

(72) Inventor: Timothy Moore Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 470 days.

(21) Appl. No.: 13/728,947

(22) Filed: Dec. 27, 2012

(65) Prior Publication Data

US 2014/0169447 A1 Jun. 19, 2014

Related U.S. Application Data

(60) Provisional application No. 61/738,347, filed on Dec. 17, 2012.

(51) Int. Cl.
*H04N 7/26* (2006.01)
*H04N 19/86* (2014.01)
*H04N 19/82* (2014.01)

(52) U.S. Cl.
CPC ......... *H04N 19/00909* (2013.01); *H04N 19/82* (2014.11); *H04N 19/86* (2014.11)

(58) Field of Classification Search
None
See application file for complete search history.

(56) References Cited

U.S. PATENT DOCUMENTS

| 7,680,351 | B2 | 3/2010 | Hellman | |
|---|---|---|---|---|
| 2003/0093445 | A1* | 5/2003 | Schick et al. | ................. 707/205 |
| 2005/0259742 | A1* | 11/2005 | Hellman | ................. 375/240.23 |
| 2011/0182361 | A1* | 7/2011 | Nakamura et al. | ....... 375/240.16 |
| 2012/0082241 | A1 | 4/2012 | Tsai et al. | |
| 2012/0183049 | A1* | 7/2012 | Liu et al. | ................. 375/240.03 |
| 2012/0207227 | A1* | 8/2012 | Tsai et al. | ................ 375/240.29 |

OTHER PUBLICATIONS

Sullivan et al. ("Overview of High Efficiency Video Coding (HEVC) Standard" IEEE Trans. on Circuits and System for Video Technology, vol. 22 No. 12, 2012).*
Mesa et al., Evaluation of Parallelization Strategies for the Emerging HEVC Standard, IEEE ASSP Mar. 2012.
Bordes et al., An overview of the emerging HEVC standard, 978-1-4244-5997-1/10 2010 IEEE.

* cited by examiner

*Primary Examiner* — Kate Luo
(74) *Attorney, Agent, or Firm* — Brinks Gilson & Lione

(57) ABSTRACT

Systems and methods are provided that allow a deblocking filter and a sample adaptive offset (SAO) filter to be combined in a loop filter stage of a High Efficiency Video Coding (HEVC) decoder. In combining the deblocking filter and the SAO filter, an intermediate buffer may not be utilized, while still allowing for the deblocking filter and the SAO filter to operate substantially in parallel. The order of pixel processing and the parallelization of operation is such that the processing performed by the SAO filter need not hinder the processing performed by the deblocking filter within the loop filter stage. Additionally, and by combining the deblocking filter and the SAO filter without utilizing buffering therebetween, savings in space and cost in implementing the HEVC decoder may be realized.

19 Claims, 14 Drawing Sheets

COMBINATION HEVC DEBLOCKER/SAO FILTER

TECHNICAL FIELD

The technical field of the present disclosure relates to video coding systems and standards, and more particularly, to combining a deblocking filter and sample adaptive offset (SAO) filter in the same decoder pipeline stage.

BACKGROUND

The ITU-H.264 Standard (H.264), also known as MPEG-4, Part 10, and Advanced Video Coding (AVC), may encode a video stream on a frame-by-frame basis, and may encode video frames on a macroblock-by-macroblock basis. The H.264/AVC standard may specify the use of spatial prediction, temporal prediction, discrete cosine transformation (DCT), interlaced coding and/or lossless entropy coding, for example, to compress macroblocks within a video stream.

During encoding of video information utilizing H.264/AVC, prediction error information may be encoded together with prediction mode information, as well as with other side information necessary for the decoding process. In order to encode the prediction error information, DCT may be applied to transform the prediction error information into frequency domain coefficients prior to encoding. However, during such encoding and transformation processes within a video encoder, certain information relating to the prediction error, for example, may be lost.

As a result of the lost information, the quality of the decoded video signal may decrease. After quantized frequency coefficients are transformed back to prediction error information and a macroblock is reconstructed, certain artifacts may appear in the decoded video stream, especially when high compression is used. More specifically, transform blockiness may appear in the decoded video stream in the form of, e.g., square grid artifacts, where the transform blockiness can be associated with missing pixel information along one or more horizontal and/or vertical borders, or edges between neighboring macroblocks. Still other artifacts may appear in the decoded video stream due to the lost information. For example, and as video information is increasingly compressed, the colors of a macroblock may become more "averaged" which can make pixels within the macroblock closer in color. As this effect increases, the borders of the macroblocks can become more obvious, i.e., pixelization.

In video systems that utilize blocks of video information, a video deblocker may be relied upon to smooth the visual transition between adjacent video blocks. That is, and for example, during a conventional deblocking process, pixels from previously processed or deblocked macroblocks may be utilized to deblock one or more portions of pixels within a current macroblock thereby creating, e.g., a smoother transition between macroblocks. The previously processed pixels can be initially fetched from memory, for example, and then utilized in the processing/deblocking of pixels within the current macroblock.

The High Efficiency Video Coding (HEVC) standard is another video coding standard based on the same structure as prior hybrid video codecs, such as, e.g., H.264/AVC. HEVC is targeted to ultra high resolution video with higher frame rates as compared to, e.g., H.264/AVC. To accomplish this, the HEVC standard has introduced an image partitioning scheme, where images may be divided into squares referred to as coding units (CUs) to increase coding efficiency, and where the CU division can be a recursive tree split. In accordance with the HEVC standard, an image may be divided into equal-sized squares referred to as largest coding units (LCUs), which in turn, may be further sub-divided into smaller squares, i.e., the CUs. The LCUs can be encoded in raster order, and the CUs may use a recursive "Z" scan. Each CU may then be divided further into transform blocks, referred to as transform units (TUs).

In addition the encoding differences, the HEVC standard differs from previous video coding standards in that it specifies two loop filters for decoding purposes. To restore a degraded frame caused by the aforementioned compression, a deblocking filter (similar to that utilized in the H.264/AVC standard) may first be utilized to reduce blocking artifacts. Additionally, a new sample-adaptive offset filter (SAO) may be utilized to classify reconstructed pixels into categories, and reduce distortion by adding an offset to pixels of each category in a current region. In accordance with the HEVC standard, the deblocking filter and the SAO filter may be considered to be separate decoder pipeline stages, to be performed sequentially.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
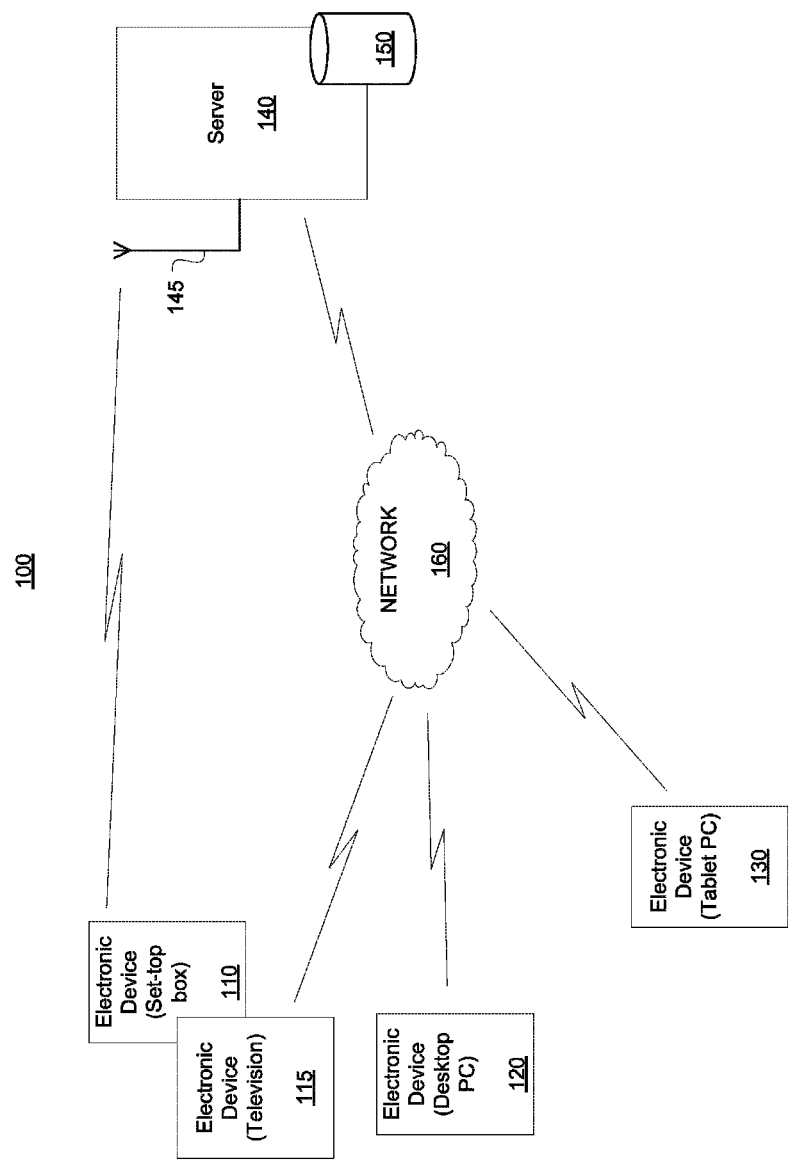
FIG. 1 illustrates an example system in which a video coding system may be implemented in accordance with various embodiments.

FIG. 1 illustrates an example system 100 in which a video coding system may be implemented in accordance with various embodiments. It should be noted that not all of the depicted components/elements may be required, however, and one or more implementations may include additional components not shown in FIG. 1. Variations in the arrangement and type of the components may be made/implemented without departing from the spirit or scope of the claims as set forth herein.

The system 100 of FIG. 1 may include a variety of electronic devices 110, 120, 130 that are communicably connected to a server 140, such as by a network 160, and one or more electronic devices 115 that can receive analog or digital transmissions from the server 140 through an antenna 145. In another example, the electronic devices 110, 120, 130 may be communicably connected to one another, such as by the network 160, but not communicably connected to the server 140.

In accordance with various embodiments, the electronic devices 110, 120, and 130 can be computing devices such as laptop or desktop personal computers (PCs), smart phones, personal digital assistants (PDAs), portable media players, set-top boxes, tablet PCs, televisions or other displays with one or more processors coupled thereto and/or embedded therein, or other appropriate computing devices that can be used for receiving and/or decoding a video stream, or than can be coupled to such a processor/computing device. In the network 100 of FIG. 1, the electronic device 110 may be a set-top box, the electronic device 120 may be a desktop PC, and the electronic device 130 may be a tablet PC.

In accordance with various embodiments, the electronic device 115 may be any device capable of receiving an analog or digital transmission of a data stream, such as a transmission of a coded video stream. In one or more implementations, the electronic device 115 may be an antenna, a satellite antenna, a television that includes an antenna, or generally any device that may receive a transmission of a data stream. In the system 100 of FIG. 1, the electronic device 115 can be representative of a television capable of receiving a digital or analog transmission, such as through an antenna, for example. In one or more embodiments, the electronic device 115 may be communicatively coupled to the electronic device 110, such that the electronic device 115 may receive audio and/or video signals from the electronic device 110.

The electronic devices 110, 115, 120, 130 may include, or may be coupled to a device that includes a decoder, such as a video decoder. The decoder may operate in accordance with one or more video coding standards or specifications, such as the HEVC standard. In one or more embodiments, the decoder may be a decoder such as that illustrated in FIG. 2 and described in greater detail below.

The network 160 may be a public communication network (such as the Internet, cellular data network, etc.) or a private communications network (such as private local area network (LAN), a network of leased lines, etc.) The network 160 may also implemented in accordance with, but not limited to, any one or more of the following network topologies, including a bus network, a star network, a ring network, a mesh network, a star-bus network, a tree or hierarchical network, and the like. The network 160 may also include one or more satellite relays or satellite transmission systems. In one or more embodiments, a data stream from the server 140 may be transmitted to a satellite and then relayed from the satellite to one or more of the electronic devices 110, 115, 120, and 130. In these one or more embodiments, the electronic devices 110, 115, 120, 130, and the server 140, may include, or may be coupled to, a satellite dish or other antenna capable of receiving a transmission from a satellite.

The server 140 may include, or may be coupled to, one or more processors/processing devices (not shown) and/or one or more databases/data stores 150. The one or more processors can execute computer instructions stored in the database 150, for example, to implement a video coding system. The database 150 may store the computer instructions on a non-transitory computer-readable medium. In one or more embodiments, the server 140 may be a single computing device such as a computer server. Alternatively, the server 140 may represent multiple computing devices that are working together to perform the actions of a server computer (such as a cloud of computers and/or a distributed computing system). The server 140 may be coupled with various databases, storage services, or other computing devices, that may be co-located with the server 140 or may be disparately located from the server 140.

In one or more implementations, the server 140 may be communicatively coupled to an antenna 145. The antenna 145 may be capable of transmitting wireless transmissions, such as video stream transmissions. The server 140 may also be communicatively coupled with a satellite dish capable of communicating a data stream to a satellite, such as a video data stream, which may be relayed by the satellite to one or more of the electronic devices 110, 115, 120, 130.

The server 140 may include, or may be coupled to a device that includes, an encoder, such as a video encoder. The encoder may operate in accordance with one or more video coding standards or specifications, such as the HEVC standard. In one or more embodiments, the encoder may be an encoder such as that illustrated in FIG. 2 and described in greater detail below.

In operation, the server 140 may encode a video sequence into a coded video sequence. The server 140 may encode the video sequence in real-time, or in non real-time. The server 140 may then transmit the coded video sequence to one or more of the electronic devices 110, 115, 120, 130, via, e.g., the network 160, the antenna 145, a satellite relay transmission, or any other transmission system. The electronic devices 110, 115, 120, 130 may receive the coded video sequence transmitted from the server 140, and may decode the coded video sequence in real-time or in non real-time. The electronic devices 110, 115, 120, 130, may provide the decoded video sequence to users who are interacting with the electronic devices 110, 115, 120, 130, such as by presenting the decoded video sequences on a display.

Figure 2:
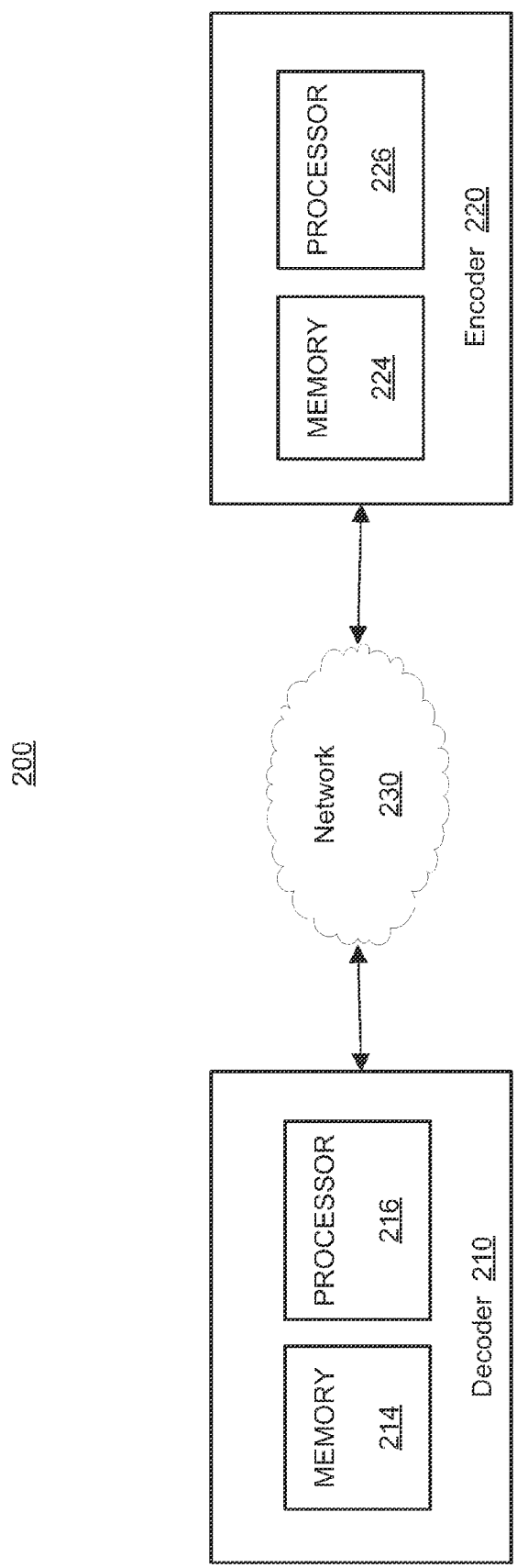
FIG. 2 illustrates an example encoder and decoder architecture in accordance with various embodiments.

FIG. 2 illustrates an example encoder and decoder architecture system 200 (which can be an embodiment of the system 100 of FIG. 1) in accordance with various embodiments. As previously noted, not all of the depicted components/elements may be required, and one or more embodiments may include additional components not shown in FIG. 2. Variations in the arrangement and type of the components/elements may be made without departing from the spirit or scope of the claims as set forth herein.

The system 200 can include a decoder 210, an encoder 220, and a network 260 to which both the decode 210 and the encoder 220 may be communicably connected. The decoder 210 may include a memory 214 and a processor 216, while the encoder may also include a memory 224 and a processor 226. In operation, the processor 226 of the encoder 220 may execute computer instructions that are stored in the memory 224, such as computer instructions for encoding a video sequence. For example, the processor 226 of the encoder 220 may execute a process to encode a video sequence, and transmit the encoded video sequence to the decoder 210 over the network 230. The processor 216 of the decoder 210 may execute computer instructions that are stored in the memory 214, such as computer instructions for decoding the received coded video sequence. For example, the processor 216 of the decoder 210 may execute a process to decode the coded video sequence.

Figure 3:
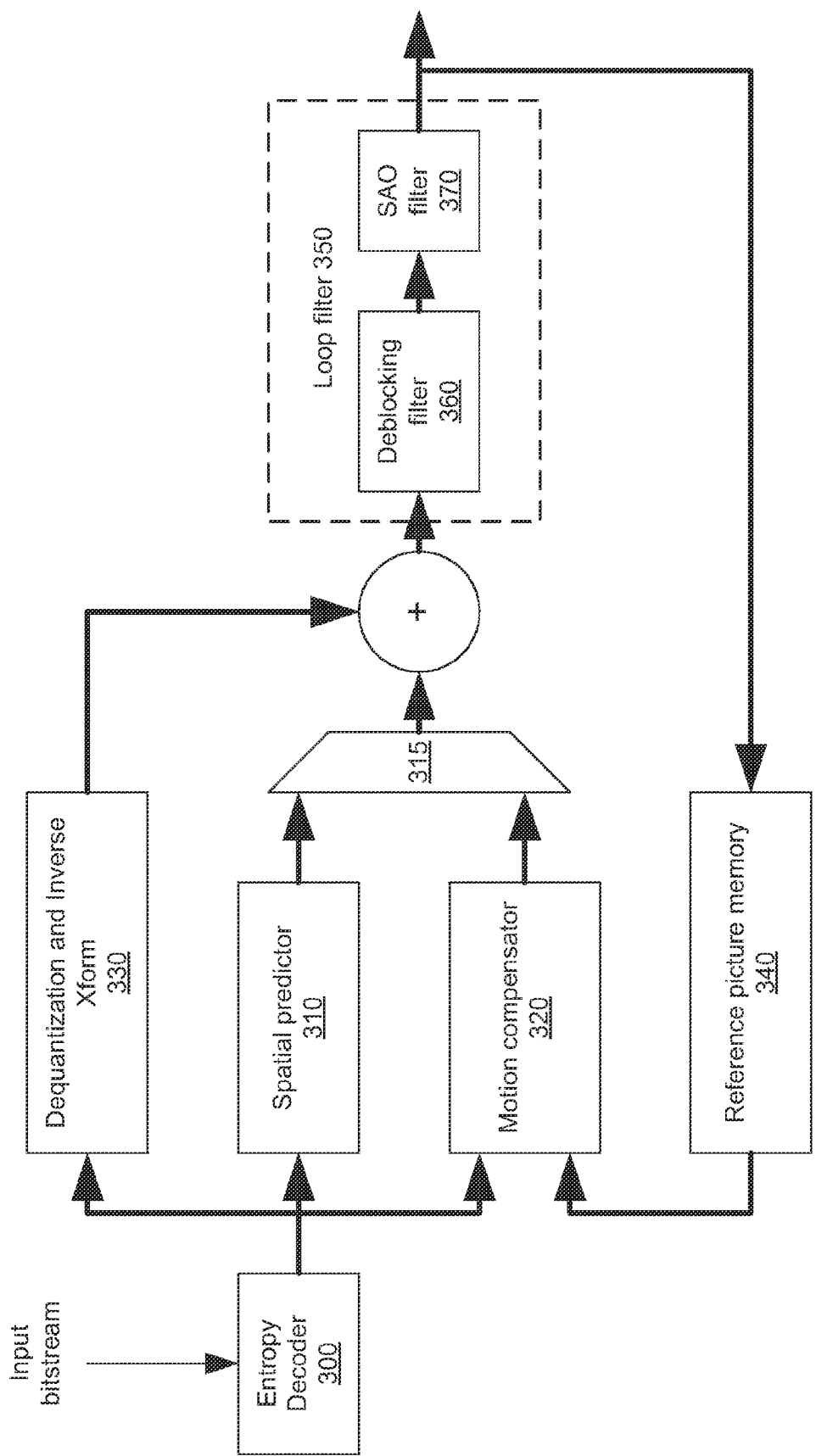
FIG. 3 illustrates an example data flow associated with a conventional HEVC decoder specified in accordance with the HEVC standard.

FIG. 3 illustrates an example data flow associated with a conventional HEVC decoder specified in accordance with the HEVC standard. As illustrated in FIG. 3, an input bitstream may be entropy decoded by an entropy decoder 300. By entropy decoding the input bitstream, the entropy decoder 300 can convert the input bitstream into a series of transform coefficients, spatial prediction modes, and motion compensation vectors. A spatial predictor 310 and a motion compensator 320 may then produce predictions based on the obtained series of transform coefficients, spatial prediction modes, and motion compensation vectors. It should be noted, however, that only one or the other (i.e., either spatial prediction or motion compensation) may be used for any given block of pixels, e.g., a coding unit (CU) which will be discussed in greater detail below. Accordingly, selective logic/circuitry 315, such as an multiplexor, may be used to effectuate such a determination. The prediction (whether spatial prediction or motion compensation) may then be added to a residual signal, which can come from a dequantization and inverse transform module 330. The result of the addition of the prediction and the residual signal (e.g., a reconstructed video signal) can be passed to a loop filter 350 to smooth out artifacts, for example. The output of the loop filter 350 may be passed to a reference picture memory 340 as feedback for use in motion compensation.

In accordance with the HEVC standard, the loop filter 350 may include two separate filters, a deblocking filter 360 and an SAO filter 370. Further in accordance with the HEVC standard, the filtering performed by the deblocking filter 360 and the SAO filter 370 is applied serially, e.g., a block (of a picture, such as an LCU) may be deblocked first by the deblocking filter 360, and then offsets can be applied by the SAO filter 370. It should be noted that in accordance with the HEVC standard, and although the filtering performed by the deblocking filter 360 and the SAO filter 370 is applied serially, one or more buffers (not shown) may be utilized between the deblocking filter 360 and the SAO filter 370 to allow for parallel operation of the deblocking filter 360 and the SAO filter 370. That is, the deblocking filter 360 may perform filtering on a block while the SAO filter 370 may perform filtering on a previous block already acted on by the deblocking filter 360 and stored in one of the aforementioned buffers, to avoid delays/lags in processing.

In accordance with various embodiments, a loop filter may have a deblocking filter that is combined with an SAO filter into a single stage of a decoder pipeline. Further in accordance with various embodiments, buffering need not occur between the deblocking filter and the SAO filter, yet pixels may still be processed almost entirely in parallel. Accordingly, and when implementing an HEVC-compliant decoder on, e.g., a silicon chip/wafer, less area can be used to implement a loop filter without adding additional processing time. That is, and if a deblocking filter were to be combined with an SAO filter without the use of one or more buffers, and without the techniques/processes described in the present disclosure in accordance with various embodiments, the time to perform deblocking would necessarily be added to the time needed to add an offset, as the SAO filter would need to wait until the deblocking filter has completed its processing (i.e., deblocking).

Figure 4:
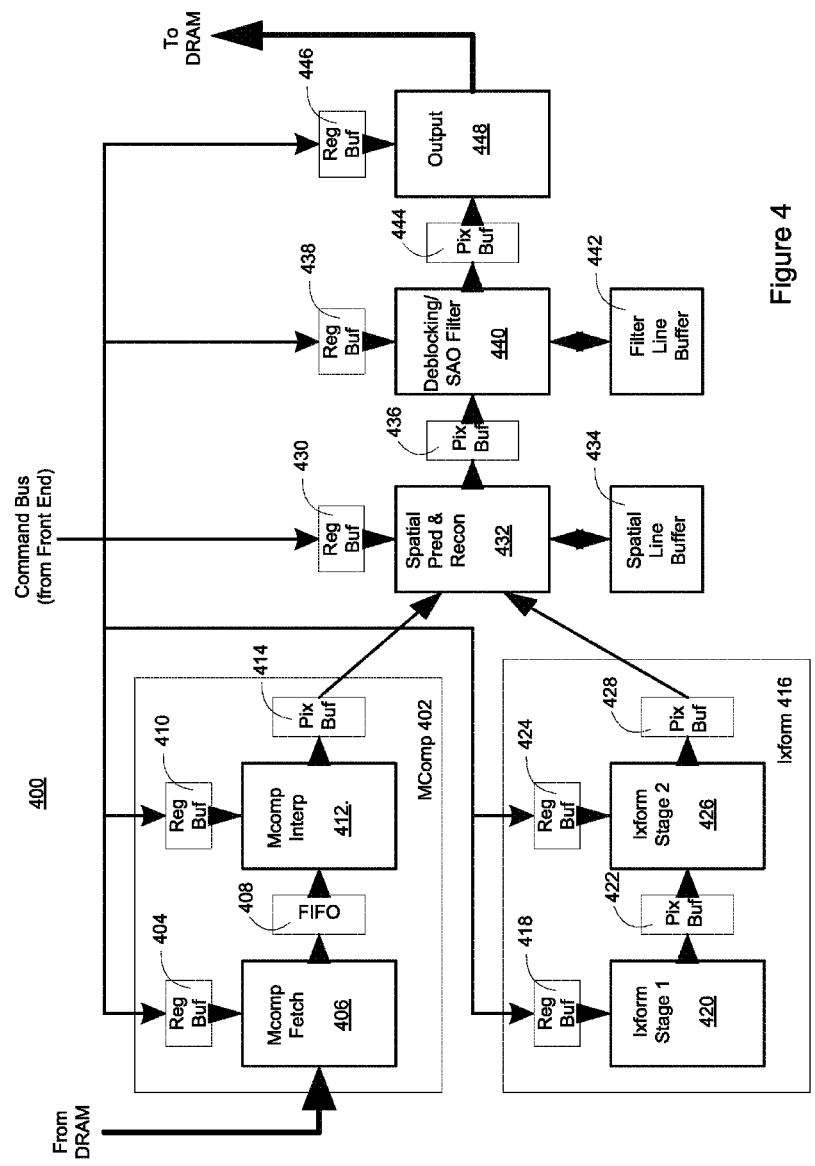
FIG. 4 illustrates an example backend module of a decoder in accordance with various embodiments.

FIG. 4 illustrates an example backend module 400 of a decoder configured in accordance with various embodiments. As previously described, an input bitstream may be entropy decoded by an entropy decoder, such as the entropy decoder 300 of FIG. 3 to convert (decode) the input bitstream into symbols, i.e., the aforementioned series of coefficients, spatial prediction modes, and motion compensation vectors. The entropy decoding may be considered a part of a front end module of the decoder, where the series of transform coefficients, spatial prediction modes, and motion compensation vectors may be received at the backend module 400 via a command bus.

The motion compensation vector information may be received at a motion compensation module 402 that may include, e.g., a motion compensation fetch module 408 that can fetch a predictive block(s) based on a received motion compensation vector from dynamic random access memory (DRAM). This information may be passed through a first-in-first-out (FIFO) module 408 for, e.g., buffering/flow control, to a motion compensation interpolation module 412. The series of transform coefficients may be received at an inverse transform module 416, which can include two inverse transform modules 420 and 426 (for stage 1 and stage 2 inverse transform operations, respectively).

The respective outputs of the motion compensation module 402 and the inverse transform module 416 may be sent to a spatial prediction and reconstruction module 432, where the spatial prediction and reconstruction module 432, itself, may receive the aforementioned spatial prediction modes from the front end of the decoder. A spatial line buffer 434 may be used to store information regarding blocks associated with one or more blocks of, e.g., a previous line (row).

A combination deblocking/SAO filter (loop filter) 440 may receive information from the front end of the decoder, e.g., what type of filtering to apply (strong, weak, etc.), what edges to deblock, etc., and what offset values to add to each deblocked pixel, as will be described in greater detail below. The combination deblocking/SAO filter 440 may also have an associated filter line buffer 442 for storing appropriate information from a previous line. Decoded blocks may be sent to an output module 448 for outputting a decoded video stream to DRAM.

As also illustrated in FIG. 4, each stage (which may correspond to each function/process/module described above) of the backend module 400 of the decoder may have an associated register buffer (404, 410, 418, 424, 430, 438, 446) and pixel buffer (414, 422, 428, 436, 444). The register buffers for each stage may be thought of as generally storing information from the front end of the decoder regarding how to process/operate on pixels, where the pixels to be processed/operated on are determined from the respective pixel buffers. For example, and as alluded to previously, the register buffer 438 may receive and store information from the front end of the decoder regarding, e.g., whether the deblocking filter of the combination deblocking/SAO filter 440 should apply a weak or strong filter, and to which edges of a block. That is, the deblocking filter of the combination deblocking/SAO filter 440 can determine where edges are in a block, so that pixel values can be analyzed to determine whether an artifact should be smoothed out or kept as is.

The register buffer 438 may also receive and store information from the front end of the decoder regarding, e.g., which offsets the SAO filter of the combination deblocking/SAO filter 440 should add to each deblocked pixel. That is, in video coding/decoding, not every pixel/movement can be predicted, resulting in some amount of error. Referring back to the inverse transform module 416, a transform of the error may be sent while discarding high frequency errors to determine block edge errors. The SAO filter of the combination deblocking/SAO filter 440 can be utilized to reduce such errors by adding, e.g., a small offset (e.g., +1, +2).

The register buffers (404, 410, 418, 424, 430, 438, 446) and the pixel buffers (414, 422, 428, 436, 444) can allow each respective stage to be decoupled from other stages, allowing processes to proceed in parallel. However, the use of such buffers, each of which can require a considerable amount of memory to implement, takes up silicon chip area. Because the deblocking filter and the SAO filter (implemented separately with at least a buffer in between in accordance with the HEVC standard), is in contrast, combined into a combination deblocking/SAO filter, e.g., combination deblocking/SAO filter 440, memory area is saved, while again, preserving the ability of the filters to process pixels almost entirely in parallel.

As described above, a loop filter made up of a combination deblocking/SAO filter, such as the combination deblocking/SAO filter 440 of FIG. 4, may be used for deblocking purposes and adding a (small) offset to regions of a picture. In particular, the deblocking filter of the combination deblocking/SAO filter 440 can be an edge filter that operates on the edges of 8×8 (luma pixels) blocks and 4×4 (chroma pixels) blocks.

Figure 5A:
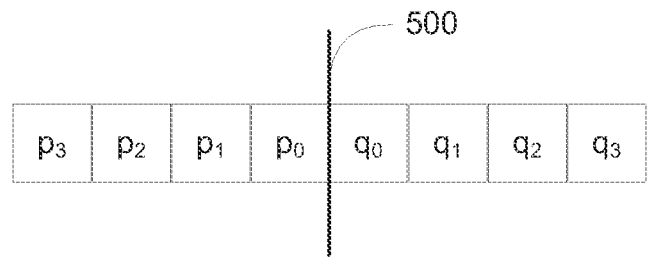
FIGS. 5A and 5B illustrate example luma and chroma pixel filtering in accordance with various embodiments.
Figure 5B:
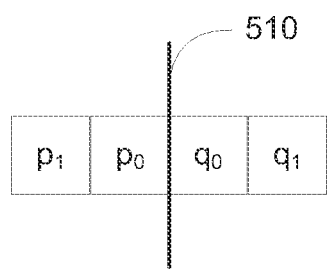

FIG. 5A illustrates an example vertical edge 500 of an 8×8 block with 4 pixels on either side of the vertical edge 500, e.g., pixels p0, p1, p2, and p3 on the left side of the vertical edge 500, and, e.g., pixels q0, q1, q2, and q3 on the right side of the vertical edge 500. In accordance with the HEVC standard, up to 3 pixels on each side of a luma edge may be modified, which in this example can be pixels p0, p1, p2, q0, q1, and q2. Also in accordance with the HEVC standard, pixels on each side of a chroma edge may be used, where 1 pixel on either side of the chroma edge may be modified. FIG. 5B illustrates an example chroma edge 510 with pixels p0 and p1 on the left side of the chroma edge, and pixels q0 and q1 on the right side of the chroma edge 510. In this example, pixels p0 and q0 may be modified. Accordingly, vertical edges of a block can be independent of each other, as are horizontal edges.

The HEVC standard specifies that filtering may be performed on all vertical edges first, before filtering is performed on horizontal edges. Moreover, the filtering may be recursive, in that the pixels modified by the filtering performed on the vertical edges can be the input for the filtering performed on the horizontal edges. However, and as will be discussed in greater detail below, the vertical and horizontal filtering may be interleaved in accordance with various embodiments as a result of the vertical and horizontal edges being independent.

Figure 6:
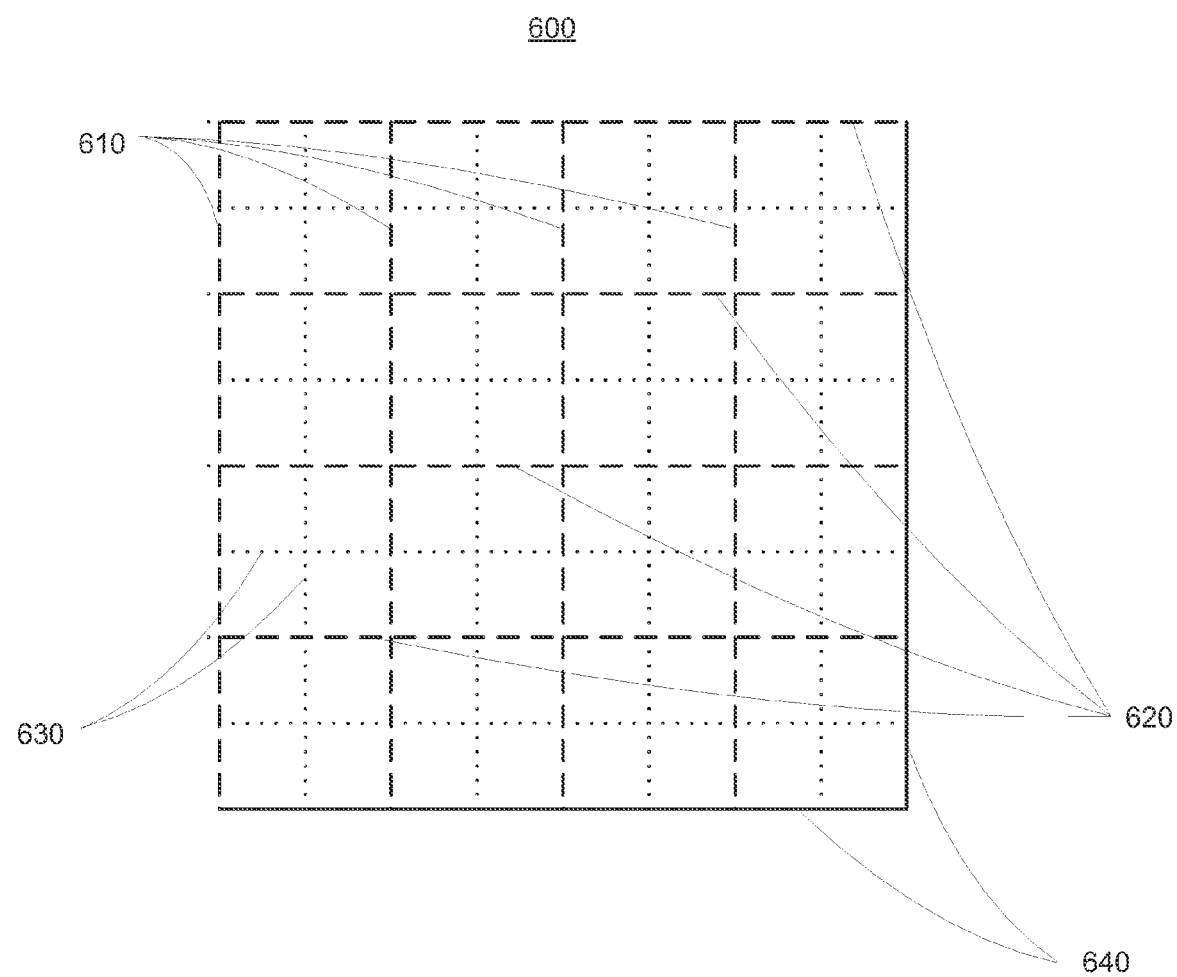
FIG. 6 illustrates an example 32×32 pixel processing block that may be filtered in accordance with various embodiments

A processing block (PB) may refer to a 32×32 processing block, which may be considered a fundamental pipeline unit of a decoder in accordance with various embodiments. Referring back to FIG. 4, it should be noted that each pixel buffer (414, 422, 428, 436, 444) may hold 2 such PBs. FIG. 6 illustrates an example PB 600. Accordingly, there are 32×32 pixels that can make up the PB 600. A deblocking filter, such as that in the combination deblocking/SAO filter 440 of FIG. 4, in accordance with various embodiments, may filter every vertical edge of an 8×8 block (delineated by hashed lines 610) and every horizontal edge of the 8×8 block (delineated by hashed lines 620). Some edges of the 4×4 blocks (delineated by dotted lines, e.g., dotted lines 630) may be left unfiltered. It should be noted that the right-most and the bottom-most edges (delineated by solid lines 640) may not be filtered as described above, because there are not yet enough pixels to the right of the right-most edge and below the bottom-most edge that have become available.

The SAO filter, such as that in the combination deblocking/SAO filter 440 of FIG. 4, in accordance with various embodiments, may be a 2-dimensional filter that can use a 3×3 pixel neighborhood to filter each pixel in a picture. The SAO filter may be considered to be non-recursive (as opposed to the deblocking filter). Accordingly, the inputs utilized for each pixel may come directly from the deblocking filter output. The SAO filter can specify a filter (operation) type to be used for each region of a picture.

Figure 7E:
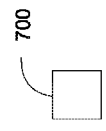
FIG. 7A-7E illustrate possible filter types that may be utilized by an SAO filter in accordance with various embodiments.
Figure 7D:
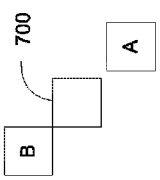
Figure 7C:
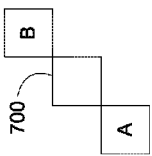
Figure 7B:
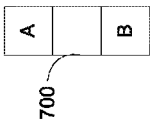
Figure 7A:
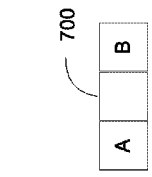

FIGS. 7A-7E illustrate 5 possible filter (operation) types that can be used by the SAO filter. FIG. 7A may represent a 0 degree filter, FIG. 7B may represent a 90 degree filter, FIG. 7C may represent a 45 degree filter, FIG. 7D may represent a 135 degree filter, and FIG. 7E may represent a band filter.

In accordance with FIGS. 7A-7D, the SAO filter can use immediately adjacent neighbors to determine whether to add one of 4 offsets to a pixel. The offset is selected by comparing the present pixel, e.g., pixel 700, to its neighbors (A and B). Again, the SAO filter may be non-recursive; and hence, no filter outputs are re-used as an input, where the intent of the SAO filter is to smooth out, e.g., extreme pixel values produced by quantization. For the first 4 types represented in FIGS. 7A-7D (i.e., 0 degree, 90 degree, 45 degree, and 135 degree) filter offsets may be selected by comparing the value of the present pixel 700 to each of its two neighbors (A and B). The resulting comparison may produce a −1 (neighbor pixel value is less than present pixel value), 0 (neighbor pixel and present pixel values are equal), or 1 (neighbor pixel value is greater than the present pixel value). The two comparisons may be summed which can give a value from −2 to 2. For a resulting 0, no filtering is applied, while the other 4 values may be used to look up (in an offset table supplied per LCU) an offset to be applied. This offset (ranging from −8 to 7) may be added to the present pixel 700. Each component may have a separate offset table. The band filter illustrated in FIG. 7E may also uses offsets, but these offset can be applied based on the present pixel value itself. It should be noted that the structure of the SAO filter may include, but is not limited to, a buffer RAM to hold locally adjacent neighbors, and a line buffer for top context. A control block can supply the offsets based on register loads, and other filter control information.

Figure 8:
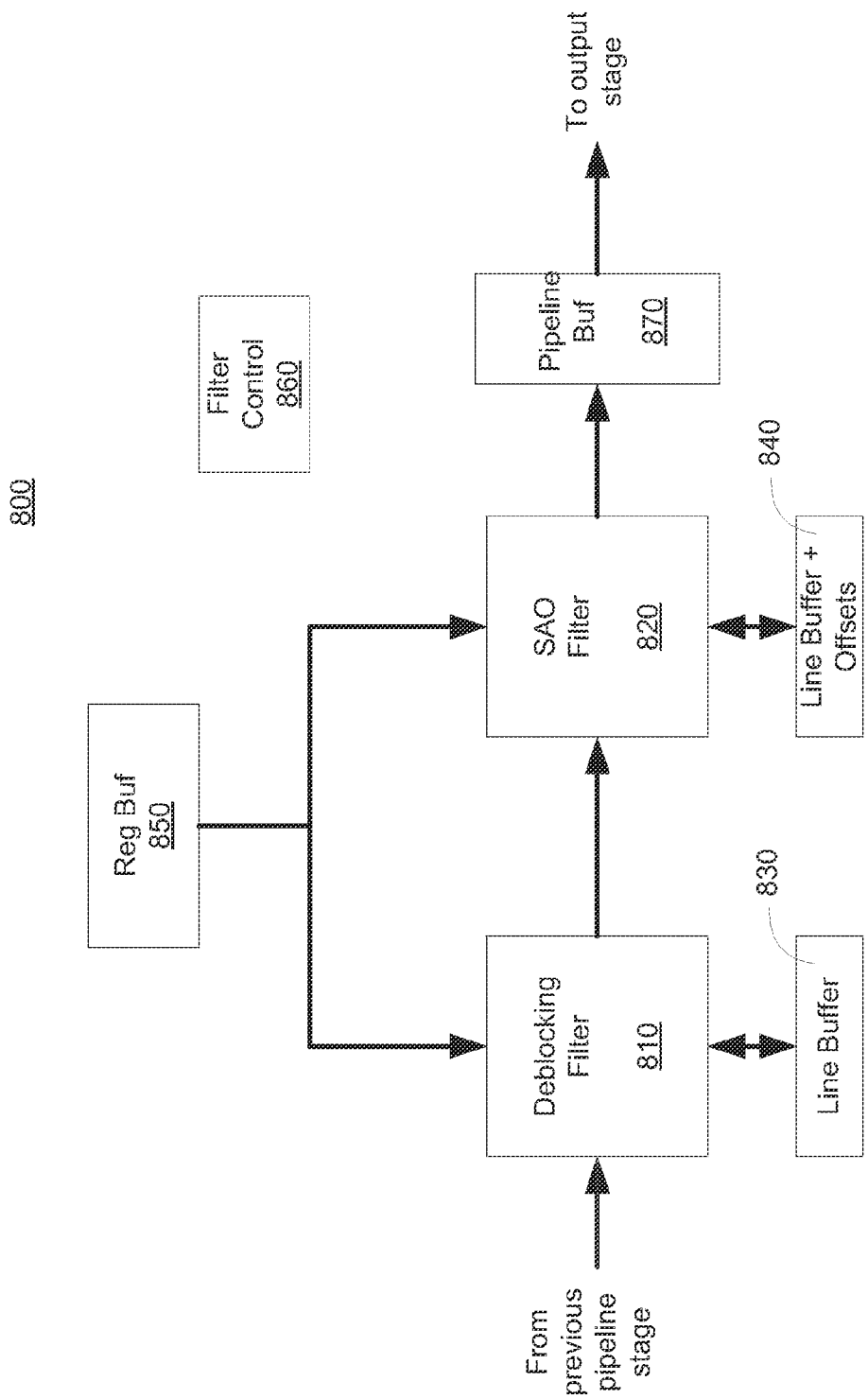
FIG. 8 illustrates an example structure of a loop filter stage in accordance with various embodiments.

FIG. 8 illustrates an example loop filter stage 800 in accordance with various embodiments. Loop filter stage 800 may be an embodiment of the combination deblocking/SAO filter (loop filter) stage 440 of FIG. 4. As previously described, a deblocking filter 810 may be followed directly (i.e., without an intermediate buffer) by an SAO filter 820. That is, the output of the deblocking filter 810 may feed directly into the SAO filter 820, which may then pass the data to a pipeline (pixel) buffer 870, and on to an output stage (e.g., the output 448 of FIG. 4).

The deblocking filter 810 and the SAO filter may each have their own line buffer (830 and 840, respectively) and control storage. As may be done on a full PB-basis, all the register loads for a full PB (such as the PB 600 of FIG. 6) may be transferred to the filter control 860 at the start of PB processing, where the register buffer 850 may store the register loads from the command bus (from the front end of the decoder). Input to the loop filter stage 800 may come from a pipeline (pixel) buffer in the spatial predictor (such as the spatial prediction and reconstruction module/stage 432 of FIG. 4), and the output may be buffered in a local pipeline (pixel) buffer 870.

Each block may require a certain amount of line buffer storage from a preceding row above. The deblocking filter 810 may require 4 lines of luma and 2 lines of chroma. The SAO filter 820 may only need 2 bits per pixel to store a decision, and 8 bytes per LCU to store offsets and filter types. The total amount of line buffer RAM may be 15K bytes for high-definition (HD)-width decoding, and 29K bytes for quad-HD (QHD, i.e., 4K width) decoding. A small amount of working RAM may be used in each of the deblocking filter 810 and the SAO filter 820 as well, while register loads can be moved from the register buffer 850 to the deblocking filter 810 and the SAO filter 920 under the control of a top-level control state machine. Each filter may decode its own register information.

As alluded to previously, combining the deblocking filter 810 and the SAO filter 820 into a single loop filter stage without losing performance, can be attributed to the SAO filter 820 not stalling the deblocking filter 810. Additionally, the loop filter stage 800 should not require significant "extra" buffering. This may be accomplished in accordance with various embodiments by passing 4 pixel components (i.e., a 32-bit word) per clock cycle between the deblocking filter 810 and the SAO filter 820, as will be further discussed below. That is, four SAO pixels per clock cycle may be filtered to keep up with the data output rate of the deblocking filter 810.

Figure 9:
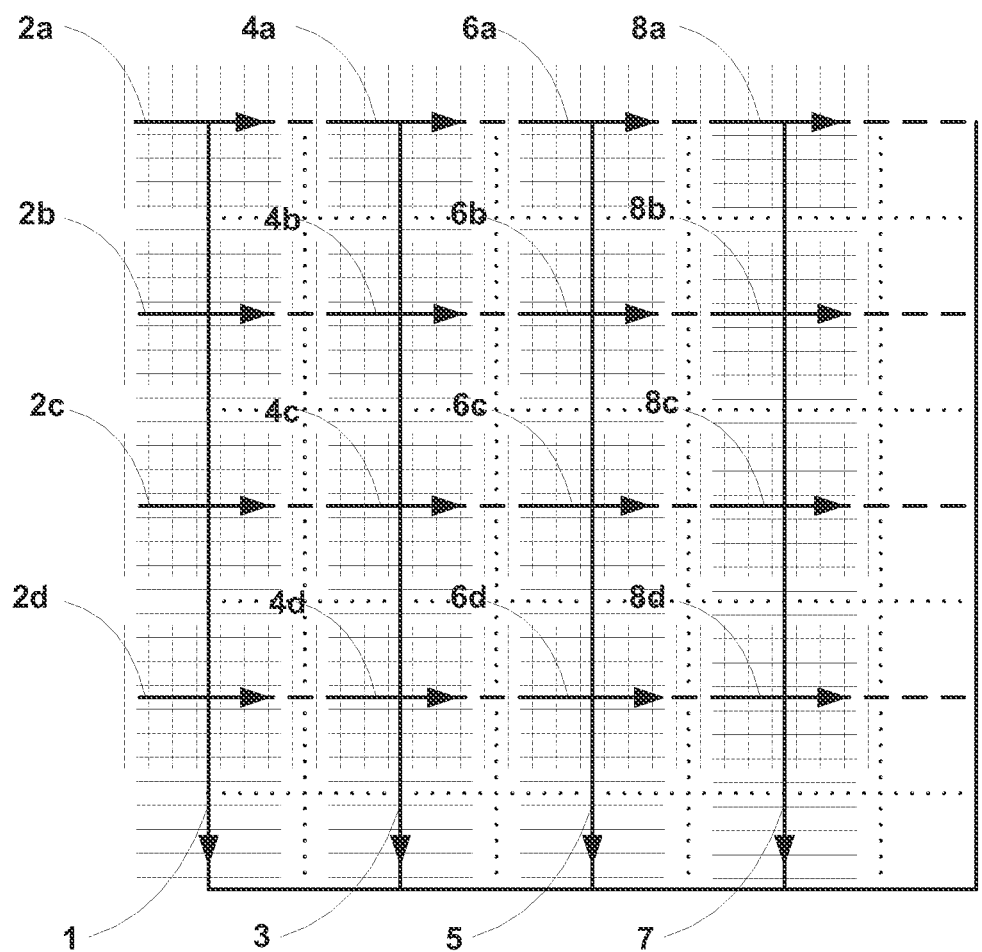
FIG. 9 illustrates an example edge processing order of the 32×32 pixel processing block of the FIG. 6 performed by a deblocking filter in accordance with various embodiments.

Again, the deblocking filter 810 may operate on columns of data in a 32×32 PB, such as PB 600 illustrated in FIG. 6. FIG. 9 illustrates an example edge processing order followed by the deblocking filter 810 on a PB 900 in accordance with various embodiments. As previously described, a deblocking filter, such as the deblocking filter 810 alternates between processing vertical and horizontal edges. This interleaved processing can be performed in an 8×32 pixel region, where an entire vertical edge (e.g., one of arrows 1, 3, 5, and 7) may be filtered, followed by all the horizontal edges affected by the vertical filtering extent (e.g., arrows 2a-d, 4a-d, 6a-d, and 8a-d). That is, an 8-pixel column (delineated by one of, e.g., arrows 1, 3, 5, or 7 and corresponding arrows 2a-d, 4a-d, 6a-d, or 8a-d) may be vertically filtered, and then run over again with a horizontal filter. Accordingly, processing may progress by following the arrows: arrow 1, then arrows 2a, 2b, 2c, and 2d, arrow 3, then arrows 4a, 4b, 4c, and 4d, arrow 5, then arrows 6a, 6b, 6c, and 6d, and arrow 7, then arrows 8a, 8b, 8c, and 8d. The deblocking filter may continue filtering in this manner, from vertical edge to vertical edge, until a whole component has been deblocked, and then it may move to the next component.

Thus, output from the deblocking filter may be produced (and sent to the SAO filter) during the horizontal filtering phase. That is, once processing is completed for one 8×32 pixel column, the data can be passed to the SAO filter, e.g., after processing following arrow 1, then arrows 2a, 2b, 2c, and 2d, the output can be processed and sent to the SAO filter. Processing edges in this way can reduce the amount of deblocking filter working RAM, because once the horizontal filtering is complete all the pixels in the 8×32 region (starting 4 pixels above & 4 pixels to the right of a vertical edge) can be completely deblocked and can be sent to the next stage. Moreover, processing edges in such an interleaved manner may still comply with the HEVC standard, as the horizontal filtering may be performed on an already completed vertical edge portion of a column.

Again, the deblocking filter may filter 4 pixel components per cycle in each phase. It should be noted that this may present a trade-off between filter performance and logic area. For example, 8 or more pixel components may be processed per cycle in other implementations that may require faster performance. Alternatively, the deblocking filter, in accordance with various embodiments, can accommodate smaller/slower processing if desired.

Figure 10:
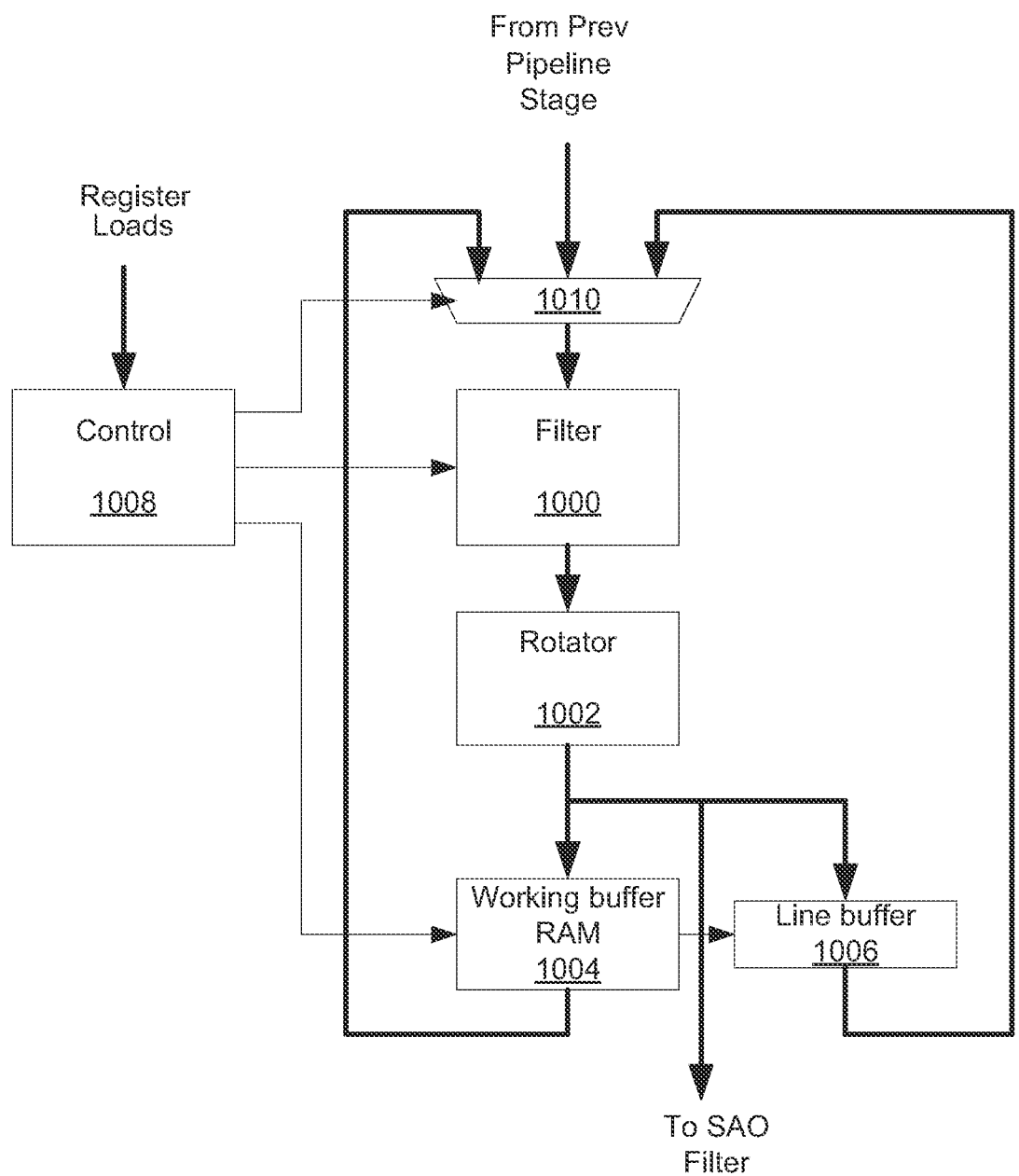
FIG. 10 illustrates an example structure of a deblocking filter in accordance with various embodiments.

FIG. 10 illustrates an example deblocking filter structure in accordance with various embodiments. The deblocking filter structure may include a filter 1000, a rotator 1002, a working buffer RAM 1004, and a line buffer 1006. As described above, a control block 1008 may receive register load information from the register buffer (e.g., register buffer 850 of FIG. 8) and pass it along to the filter 1000 in sync with pixel arrival. The working buffer RAM may be, e.g., a 768-byte RAM that can hold pixels between vertical and horizontal filtering, and also can hold left-edge pixels between PBs. The line buffer 1006 can store the bottom 4 luma rows of each PB, and the bottom 2 chroma rows of each PB after vertical filtering, so that it's available for horizontal filtering in the next PB row. The line buffer 1006 may be segmented to store each component separately. In operation, the filter 1000 can be fed alternating "p" and "q" pixel groups from one of the previous stages, the working buffer RAM 1004, or the line buffer 1006 via an OR gate 1010 or similar logic/circuitry. The rotator can transpose a 4×4 pixel array, turning vertical groups of pixels into horizontal groups of pixels, and vice versa.

Referring back to FIG. 9, and as the deblocking filter performs the horizontal edge deblocking (e.g., arrows 2a-2d), it can pass the results to the SAO filter. As described above, the SAO filter may take the output from the deblocking filter, and feed it directly into its pipeline without any significant buffering. Thus, the SAO filter may receive 8 pixel wide by 32 pixel high columns of pixels, at 4 pixels per clock cycle. The SAO filter may process these pixels in the order illustrated in FIG. 11 which illustrates how a single column of pixels may be filtered by the SAO filter in accordance with various embodiments.

Figure 11:
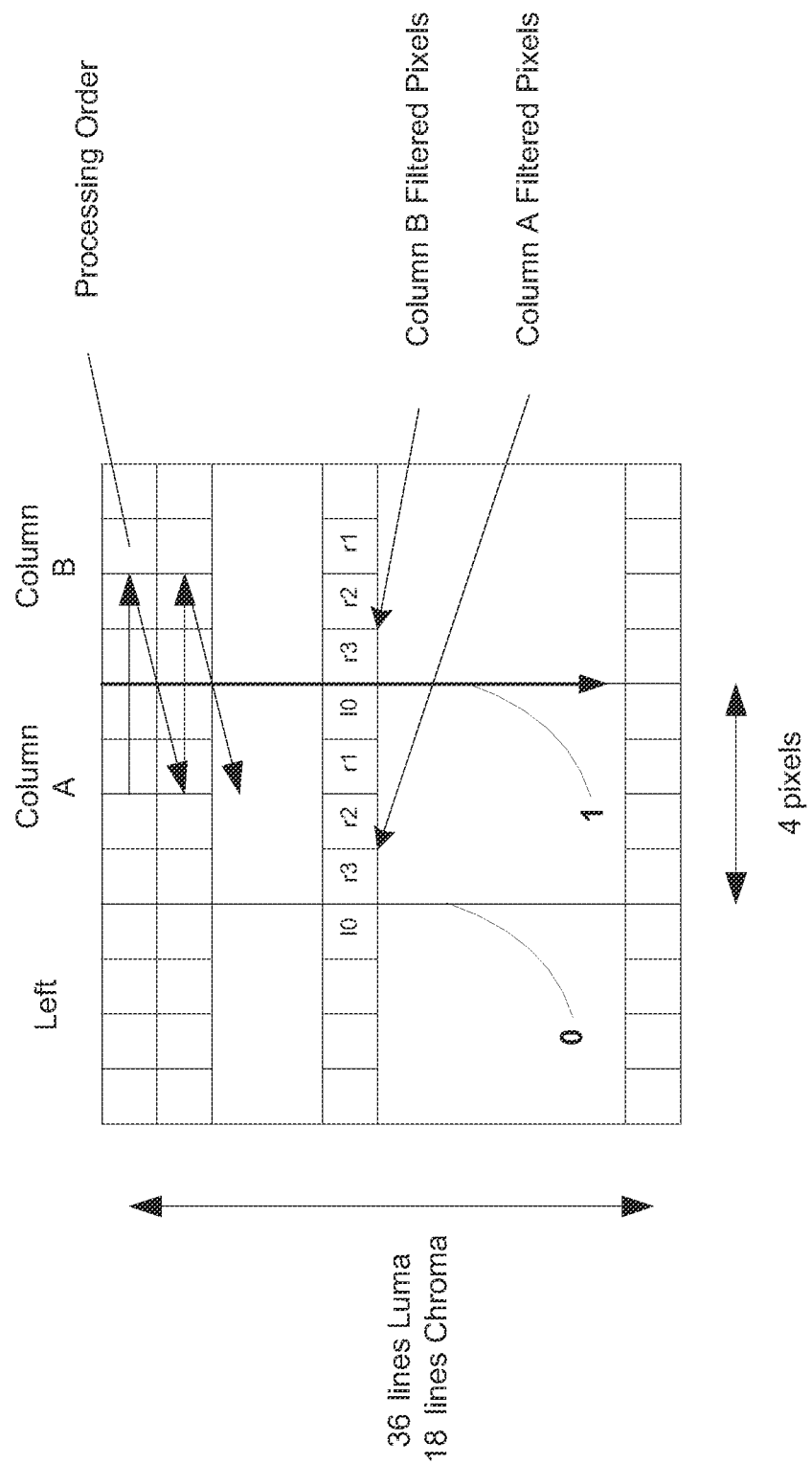
FIG. 11 illustrates and example pixel processing order followed by an SAO filter in accordance with various embodiments.

As illustrated in FIG. 11, a new set of 4 pixels may arrive on each clock, alternating between column A and column B, (where arrow 1 may be a vertical edge, such as that delineated by arrow 1 in FIG. 9), and moving down the 8×32 pixel column for the whole height of the PB, including any extra un-deblocked pixels at the bottom of the PB. The pixels that may be filtered are as shown as 10 (to the left of line 0 in column "Left"), r1, r2, r3, and 10 (to the left of arrow 1 in column A), and r3, r2, and r1 (to the right of arrow 1 in column B). It should be noted that the filtering may be offset by one pixel to the left because a right neighbor for the rightmost pixel may not yet be available. Left pixels can be kept in a buffer to supply the extra pixel for each row. As each row is filtered the pixel words from the "Left" column and column A may be output, while the column B output can replace the previous data in left edge RAM. As previously discussed, the SAO filter may not yet process the right-most pixels in the column yet, as they require a right-most neighbor. Accordingly, these pixels may be held in an edge RAM until a next column is processed. Filtering can proceed through the rest of the columns in the PB for that component, and may then move to the next component. It should be noted, that FIG. 11 illustrates a portion of a 32×32 PB as discussed previously, where there are 36 lines in the Luma plane and 18 lines in the Chroma plane. However, in accordance with other embodiments, a 16×16 LCU/PB may be processed with 20 lines Luma and 10 lines Chroma.

As described above, an SAO filter may take the output from a deblocking filter, and feed it directly into its pipeline without any significant buffering. To maintain efficiency, the SAO filter does not stall output of the deblocking filter by being configured to process, e.g., 4 pixel components per clock cycle to keep up with the output of the deblocking filter during horizontal filtering. Additionally, avoiding extra buffering, as also previously discussed, would be advantageous, as less area may be needed to implement the combination deblocking/SAO filter (and at a lower cost) in accordance with various embodiments.

Figure 12:
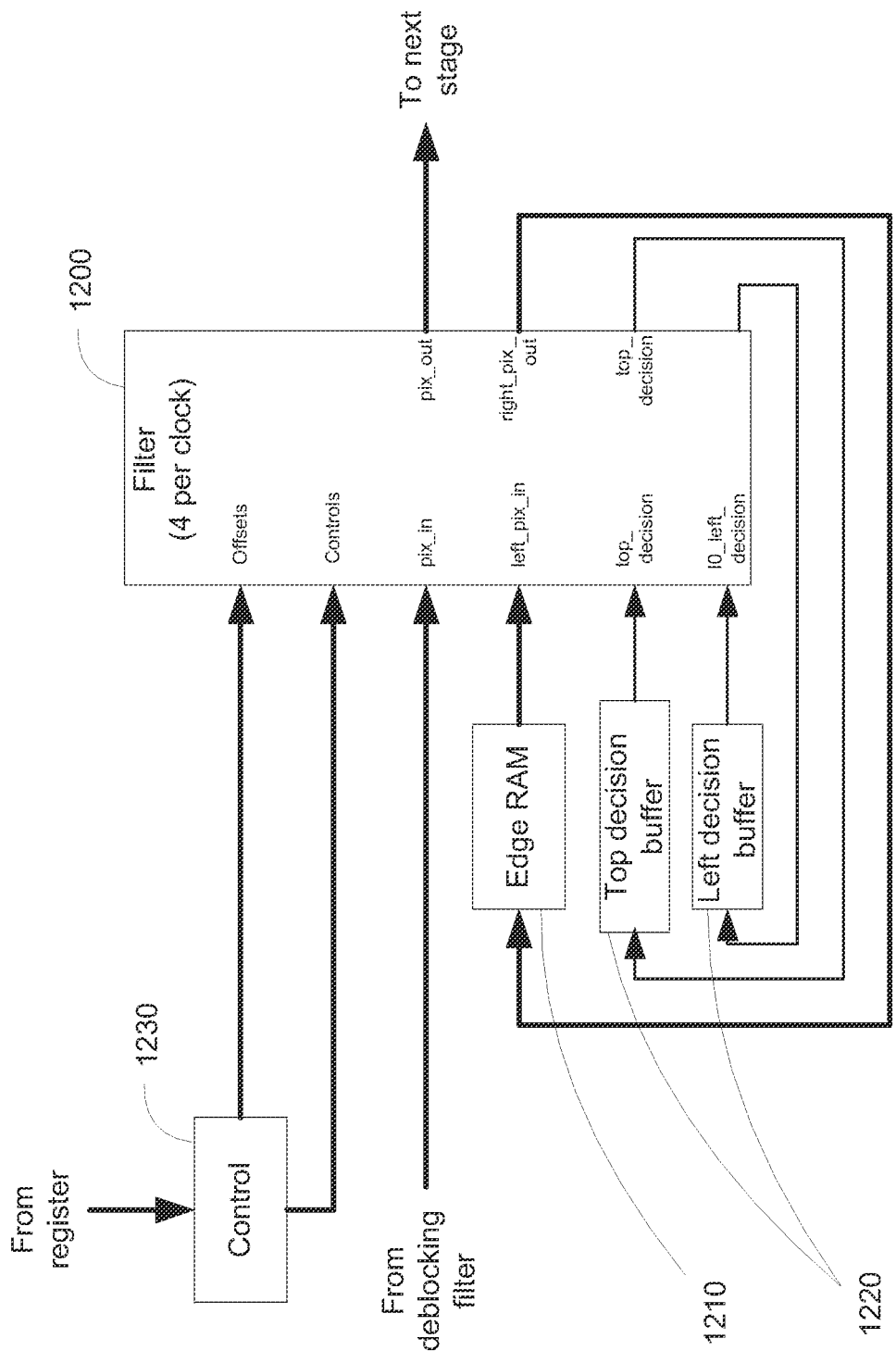
FIG. 12 illustrates an example structure of an SAO filter in accordance with various embodiments.

FIG. 12 illustrates an example SAO filter structure in accordance with various embodiments. The SAO filter structure can include a filter 1200 (which can be repeated as will be discussed below), line buffers 1220 (in this example, top and left decision buffers), an edge RAM 1210, and a control block 1230. The filter 1200 may be configured to perform two comparisons per pixel, and may include a lookup into a 4-element offset array, and a single 8-bit add and clip. The filter 1200 can be replicated 4 times (to handle the 4 pixels per clock cycle). It should be noted that the area impact of replicating the filter 1200 4 times may still be negligible when compared to the area impact of buffering for the filter 1200.

Pixels can arrive from the deblocking filter (directly), and may be combined with left edge pixels from a previous column, which may be stored in the (left) edge RAM 1210, and top and edge filter decisions (from the line buffer 1220 made up of the top and left decision buffers) for the top row of the PB being processed. The pixels may be filtered, and output to the next pipeline stage, e.g., the output 448 of FIG. 4. The control block 1230 (which can receive register load information from the register buffer (e.g., the register buffer 850 of FIG. 8)) may supply the filter 1200 with the requisite offsets, filter type info, and other miscellaneous control signals.

In terms of performance, again, the deblocking filter and the SAO filter may operate substantially in parallel by processing pixels at the deblocking filter, and directly (e.g., without an intermediate buffer) thereafter, at the SAO filter. Impact to the performance of the loop filter stage that includes the combination deblocking/SAO filter may be minimal in that a small number of cycles may be needed to flush the SAO filter pipeline at the end of the PB being processed (which may add up to only a small fraction of the overall processing time for the loop filter stage.

Figure 13:
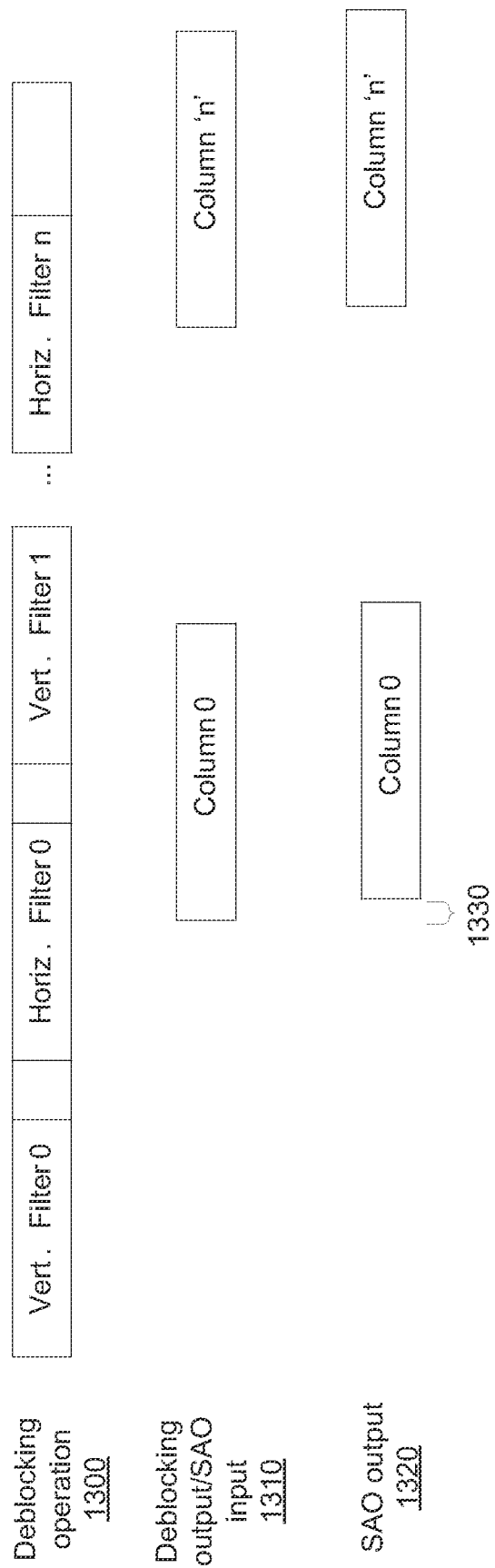
FIG. 13 illustrates an example loop filter stage processing timeline in accordance with various embodiments.

FIG. 13 illustrates an example processing timeline of a loop filter stage in accordance with various embodiments. As illustrated in FIG. 13, the deblocking operation 1300 (as described above) can involve alternating between vertical and horizontal edge processing. Columns may be sent from the deblocking filter for inputting to the SAO filter 1310. It can be seen that the SAO filter is capable of outputting filtered pixels 1320 with only a minimal delay 1330 relative to the output of the deblocking filter. Accordingly, the SAO filter may operate at substantially the same speed as the deblocking filter, and thus, the deblocking filter may be thought of as operating without needing to consider how the SAO filter may operate.

Figure 14:
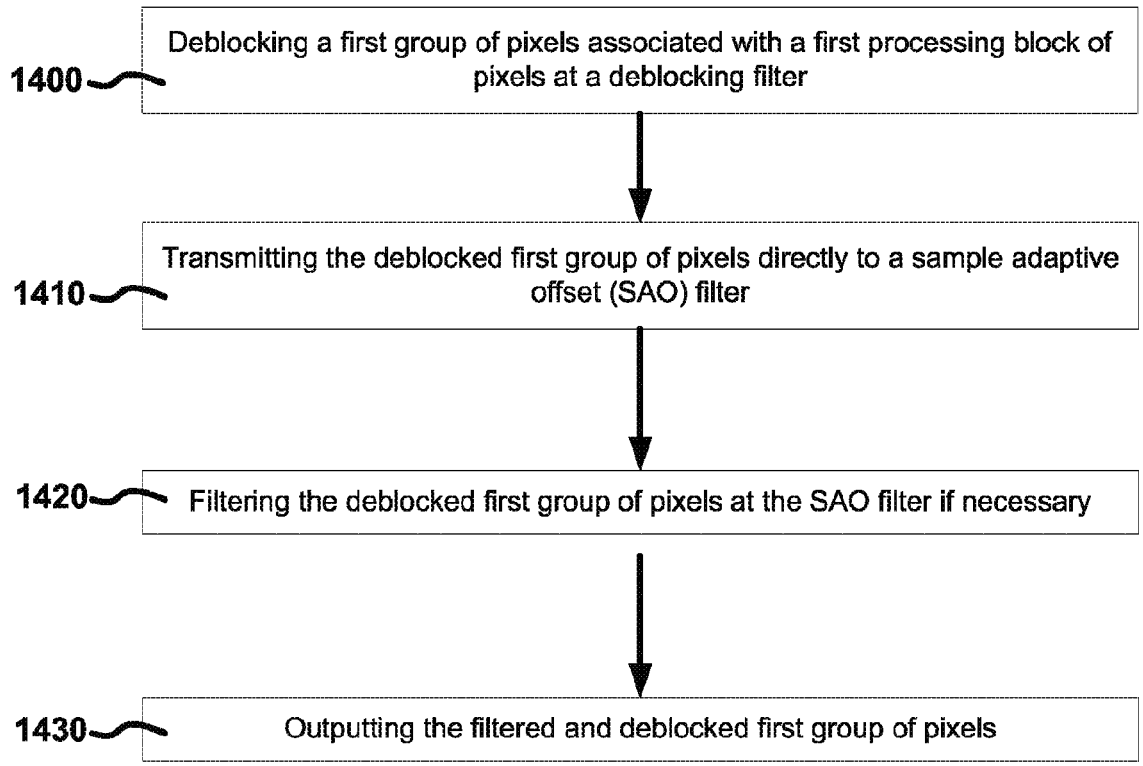
FIG. 14 illustrates example processes performed for performing deblocking and SAO filtering via a combination deblocking and SAO filter in accordance with various embodiments.

FIG. 14 illustrates example processes performed in a loop filter stage of a decoder in accordance with various embodiments. A first group of pixels associated with a first processing block of pixels may be deblocked (1400). As described above, a deblocking filter, such as the deblocking filter 810 may alternate between processing vertical and horizontal edges. This interleaved processing can be performed in an 8×32 pixel region, where an entire vertical edge may be filtered, followed by all the horizontal edges affected by the vertical filtering extent, and where the deblocking filter may process four pixel components per cycle. The deblocked first group of pixels may be transmitted directly to an SAO filter (1410). Again, combining the deblocking filter and the SAO filter into one loop filter stage in accordance with various embodiments allows such a direct transmission, without utilizing an intermediate buffer, as is done in a conventional HEVC decoder, but still allows substantially parallel processing. The deblocked first group of pixels may be filtered at the SAO filter if necessary (1420). The filtered and deblocked first group of pixels may be output (1430). That is, if necessary, the SAO filter may add an offset value to one or more pixels, and upon deblocking and adding the offset (if needed), the resulting pixels may be output to the next stage of the decoder.

In accordance with various embodiments, systems and methods are disclosed in the present disclosure that provide a loop filter stage processing order and parallelization of operation such that the SAO filter processing need not hinder operation of a deblocking filter within that loop filter stage. By combining a deblocking filter and an SAO filter without utilizing buffering therebetween, savings in space and cost of implementation on, e.g., a silicon chip, may be realized.

The various diagrams illustrating various embodiments may depict an example architectural or other configuration for the various embodiments, which is done to aid in understanding the features and functionality that can be included in those embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality is presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
in a pipeline processing circuitry comprising a single pipeline stage including a
combined deblocking filter and sample adaptive offset (SAO) filter;
receiving, at the combined deblocking filter and SAO filter, at least filter type information indicating a type of filter to be utilized by the deblocking filter and offset information indicating an offset to add to one or more pixels of a first group of pixels at a same stage time from a register buffer;
deblocking the first group of pixels associated with a first processing block of pixels at a deblocking filter;
transmitting the deblocked first group of pixels directly without buffering to a sample SAO filter;
filtering the deblocked first group of pixels at the SAO filter; and
outputting the filtered and deblocked first group of pixels.

2. The method of claim 1, wherein the first processing block of pixels comprises a 32 pixel by 32 pixel square block.

3. The method of claim 1, wherein the first group of pixels comprises a plurality of pixels left of a first vertical edge of the first processing block of pixels and a plurality of pixels right of the first vertical edge of the first processing block.

4. The method of claim 3 further comprising, and prior to transmitting the deblocked first group of pixels directly to the SAO filter:
continuing deblocking subsequent groups of pixels associated with the first processing block until an entirety of the first vertical edge of the first processing block of pixels has been deblocked; and
continuing deblocking further subsequent groups of pixels associated with the first processing block of pixels, wherein further subsequent groups of pixels comprise a plurality of pixels above and a plurality of pixels below a first horizontal edge of the first processing block of pixels crossing the first vertical edge of the first processing block of pixels.

5. The method of claim 1, wherein the deblocking at the deblocking filter and the filtering at the SAO filter occur substantially in parallel.

6. The method of claim 1, where the filtering of the deblocked first group of pixels comprises determining, at the SAO filter, whether to add one of a plurality of offsets to one or more pixels of the first group of pixels.

7. The method of claim 6 further comprising, adding the one of the plurality of offsets to the one or more pixels if necessary.

8. The method of claim 1, wherein the first group of pixels comprises a plurality of pixels left of a first vertical edge of the first processing block of pixels and a plurality of pixels right of the first vertical edge of the first processing block.

9. The method of claim 1, wherein the deblocking filter is in communication with a first line buffer and the SAO filter is in communication with a second line buffer.

10. A computer program product, stored on a non-transitory computer-readable medium, comprising:
computer code for receiving at a loop filter stage of pipeline processing circuitry of a video decoder, a reconstructed video signal divided into at least one processing block from a first pipeline stage;
computer code for reading from a register buffer load information for controlling a combination deblocking and SAO filter at a same stage time, wherein the load information including at least filter type information indicating a type of filter to be utilized by the deblocking filter and offset information indicating an offset to add to one or more pixels of a first group of pixels;
computer code for performing substantially in parallel, deblocking filtering and sample adaptive offset (SAO) filtering on the processing block, wherein the at least one processing block is provided directly from the deblocking filtering without buffering to the SAO filtering; and
computer code for sending filtered pixels making up the at least one processing block to an output stage.

11. The computer program product of claim 10, wherein the computer code for performing the deblocking filtering and SAO filtering substantially in parallel comprises computer code for passing output data from a deblocking filter performing the deblocking filtering directly to an SAO filter performing the SAO filtering.

12. The computer program product of claim 10, wherein the computer code for performing the deblocking filtering and SAO filtering comprises computer code for performing the deblocking filtering at a deblocking filter in a processing order such that a first vertical edge of the processing block is completely deblocked prior to deblocking a first portion of a first horizontal edge crossing the first vertical edge.

13. The computer program product of claim 10, wherein the computer code for performing the deblocking filtering and SAO filtering comprises computer code for performing SAO filtering at an SAO filter by determining whether to add one of a plurality of offsets to one or more pixels of the processing block, and adding the one of the plurality of offsets to the one or more pixels of the processing block if necessary.

14. The computer program product of claim 13, wherein the computer code for performing the SAO filtering at the SAO filter comprises computer code for operating the SAO filter at an SAO filter operating rate matching a deblocking filter operating rate of a deblocking filter at which the deblocking filtering is performed.

15. The computer program product of claim 14, wherein the SAO filter operating rate and the deblocking filter operating rate comprises a rate of four pixels per clock cycle.

16. A system comprising,
a pipeline processing circuitry comprising a single pipeline stage including a combination deblocking and sample adaptive offset (SAO) filter for deblocking a first group of pixels associated with a first processing block of pixels and adding an offset value to one or more pixels of the first group of pixels, wherein a deblocking filter portion of the combination deblocking and SAO filter passes output data directly without buffering to a SAO filter portion of the combination deblocking and SAO filter;
a register buffer for holding register load information for controlling the combination deblocking and SAO filter at a same stage time, wherein the load information including at least filter type information indicating a type of filter to be utilized by the deblocking filter and offset information indicating an offset to add to one or more pixels of the first group of pixels; and
at least one pixel buffer for, in conjunction with the register buffer, decoupling the system from additional stages of a video decoder.

17. The system of claim 16, wherein the register load information comprises at least filter type information indicating a type of filter to be utilized by the deblocking filter portion of the combination deblocking and SAO filter, and offset information indicating the offset value to add to the one or more pixels of the first group of pixels.

18. The system of claim 16, wherein the deblocking of the first group of pixels occurs substantially in parallel with the addition of the offset value to the one or more pixels of the first group of pixels.

19. The system of claim 16, wherein the deblocking filter portion is in communication with a first line buffer and the SAO filter portion is in communication with a second line buffer.

* * * * *